3,787,385
SYNTHETICALLY PRODUCED TETRAPEPTIDE HAVING THE ACTIVITY OF THE LUTEINIZING HORMONE RELEASING HORMONE
Karl Folkers, 6406 Mesa Drive 78731; Jaw-King Chang, 1500 E. Riverside Drive 78741; and Hans Sievertsson, 2217 S. Lakeshore Blvd. 78741, all of Austin, Tex.
No Drawing. Filed May 17, 1971, Ser. No. 144,294
Int. Cl. C07c *103/52*
U.S. Cl. 260—112.5          1 Claim

ABSTRACT OF THE DISCLOSURE

A new tetrapeptide, L-p-glutamyl-L-tyrosyl-L-arginyl-L-tyrptophan amide, having the hormonal activity of the luteinizing hormone releasing hormone (LRH) of the hypothalamus gland of mammals is provided by utilizing as key starting materials, the amino acids, glutamic acid, tyrosine, arginine, and tryptophan. Synthesis of the new tetrapeptide, is accomplished by coupling, in appropriate free or protected forms, any combination of these four amino acids to obtain the L-p-glutamyl-L-tyrosyl-L-arginyl-L-tryptophan amide.

THE INVENTION

This invention relates to a new tetrapepetide, L-p-glutamyl-L-tyrosyl-L-arginyl-L-tryptophan amide, referred to hereinafter as pGlu-Tyr-Arg-Trp-$NH_2$, and to methods for its synthesis. This new tetrapeptide surprisingly exhibits biological and hormonal activity like that of the naturally occurring luteinizing hormone releasing hormone (LRH) of the hypothalamus in the brain of mammals, including man.

BACKGROUND OF THE INVENTION

The luteinizing hormone releasing hormone (LRH) is known to be one of the six or seven or even more neurohormones of the hypothalamus of mammalian species including man. The hypothalamus defines a comparatively small section of tissue at the base of the brain and has not yet been described within boundaries as precisely as other organs are generaly described. The hypothalamus is connected through the pituitary stalk to the pituitary gland which consists of the posterior and the anterior lobes. Biochemical transport of the neurohormones between the hypothalamus and the anterior lobe is provided by certain blood vessels in a portal system which is a network of capillaries. The blood of these capillaries passes down the pituitary stalk and becomes distributed through another system of capillaries in the anterior lobe.

In addition to LRH, there is a follicle stimulating hormone releasing hormone (FRH) and a prolactin releasing hormone (PRH). It is generally considered that there is one hypothalamic releasing hormone for each of the pituitary hormones of the anterior lobe, but this concept has not yet been proven. However, it has been established that there is a hypothalamic neurohormone which releases the luteinizing hormone of the anterior pituitary; and that is, LRH.

Presently, LRH is extracted from animal hypothalamic tissue obtained from many thousands of animals at slaughter houses with considerable difficulty since the size of the hypothalamic tissue from a full grown pig is only about 150 miligrams. The enormous task involved in obtaining LRH from animal tissue is exemplified by the fact that less than 0.5 mg. of purified, but not completely pure, LRH was obtained from the combined tissue of eighty thousand sheep (Guillemin, International Journal of Fertility, vol. 12, No. 4, p. 359 (1967)). Guillemin state that "the difficulties involved in the isolation of LRH are such, however, that we must consider as absolutely out of the question the use of hypothalamic hormones of natural sources for our clinical studies." It can be seen, therefore, that scientifically, LRH has been obtained in only very minute amounts and incompletely freed of impurities. Thousands, and sometimes hundreds of thousands, of hypothalamic fragments from as many animals are required to obtain minute quantities of the natural hormone.

THE INVENTION

It has now been found that the tetrapeptide, L-p-glutamyl-L-tyrosyl-L-arginyl-L-tryptophan amide, can be synthetically produced by utilizing starting materials which are readily available or which are readily producible. The basic starting materials, which can be utilized to synthesize the tetrapeptide of this invention, have been found to be the amino acids, glutamic acid, tyrosine, arginine, and tryptophan. These four amino acids can be used in their free or protected forms by appropriate synthetic reactions. Also glutamic acid can be used in either the so-called open form or in the so-called closed form call p-glutamic acid. Contrary to the manner in which LRH is presently obtained as described above, the methods of synthesizing the new tetrapeptide of this invention are simple, economical, flexible, and highly productive. The new synthetic tetrapeptide may be easily and widely used for its hormonal activity at the veterinary level, in agriculture animals and in human medicine.

As employed throughout this application and in the appended claims, abbreviations of the names of the amino acids employed are as follows:

Glutamic acid is "Glu" and the corresponding p-glutamic acid is "pGlu"
Tyrosine is "Tyr"
Arginine is "Arg"
Tryptophan is "Trp"

The tetrapeptide of this invention can be equivalently produced by combining pGlu-Tyr with Arg-Typ, by combining pGlu with Tyr-Arg-Trp, and by combining pGlu-Tyr-Arg with Trp and, in each of these three cases, by utilizing appropriate free or protected forms of the four amino acids. In addition, Trp can be attached to a carrier resin in solid phase methodology and the tetrapeptide then be built up by appropriate subsequent additions of the remaining amino acids in single, dipeptide, or tripeptide steps. If the tetrapeptide of the invention terminates in a $CO_2H$ group, depending upon the particular alternative method used, then this group is converted to a —$CONH_2$ group.

The new tetrapeptide of this invention is very useful to promote ovulation in mammalian species. The tetrapeptide can overcome some causes of infertility and erratic fertility. In agricultural animals, it is useful to synchronize the fertility of animals in herds for breeding operations and to induce fertility in rare and/or expensive animals such as valuable breeding stock. It is useful to increase the number of new-born animals in a litter from sows—a matter of great economic importance, and to increase twining in cows and ewes. Since it performs the hormonal function of the natural hormone and is abundantly available on an economical cost basis, it offers a great advantage over the natural LRH which has been available with great difficulty on a scientific basis and not at all on a practical basis for use in veterinary medicine and in agriculture and in human medicine.

Generally, the method by which the tetrapeptide of this invention can be obtained comprises coupling one or more of the amino acids with the remaining amino acids in the appropriate sequence, removing protective groups when present at the appropriate stages, and, finally, completing the synthesis of the tetrapeptide to give resultant pGlu-Tyr-Arg-Trp-NH₂. These basic reactions are illustrated by Charts I, II, III, IV and IV, on the following pages.
CHART I
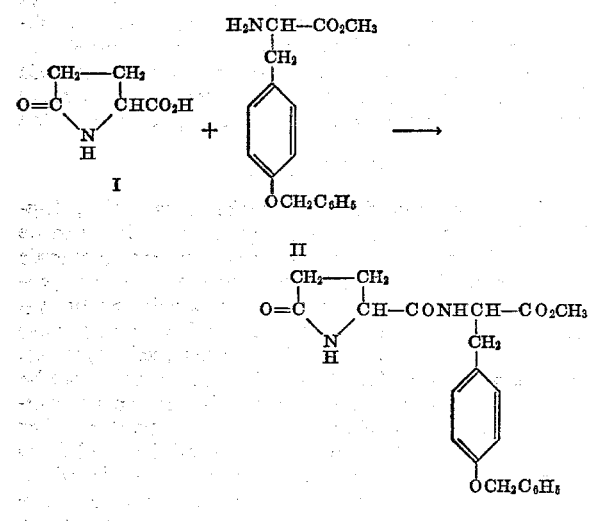
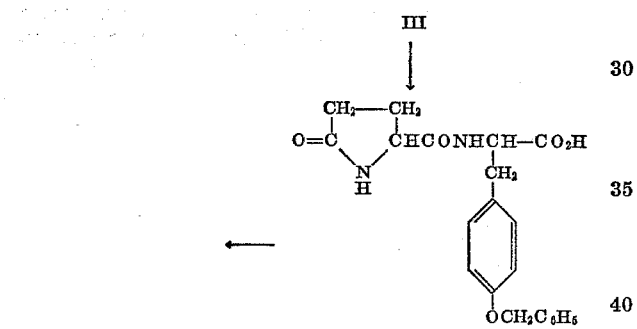
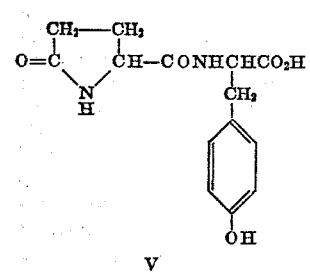
Adoc=adamantyl-(1)-oxycarbonyl
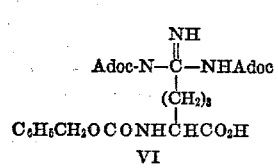
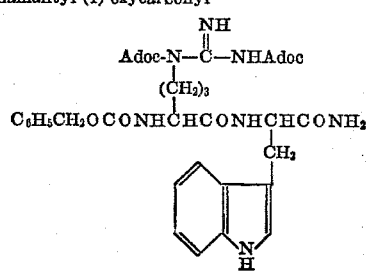
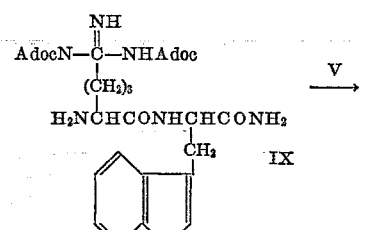
VIII ⟶    IX    ⟶ V
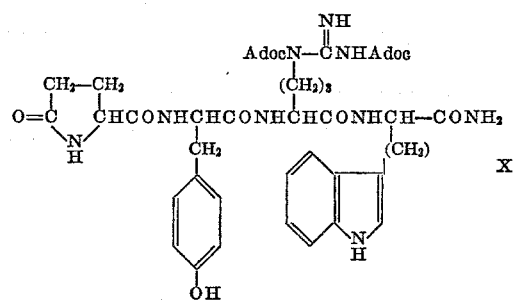
X
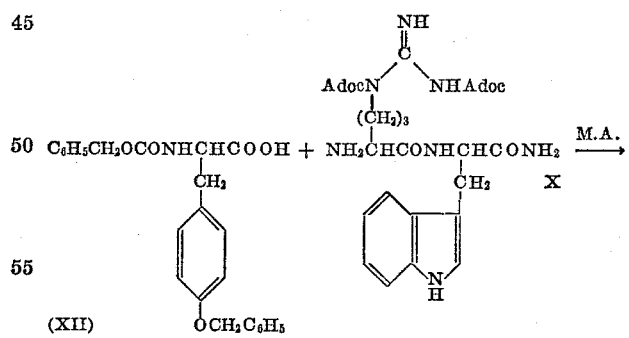
XI
p-Glu-Tyr-Arg-Trp-NH₂
CHART II
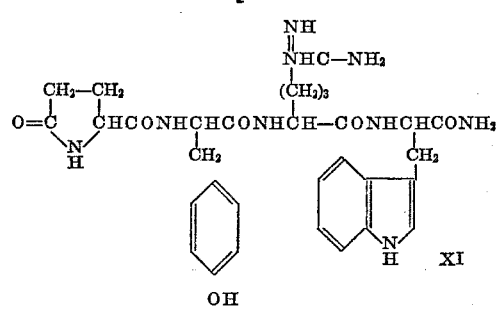
(XII)
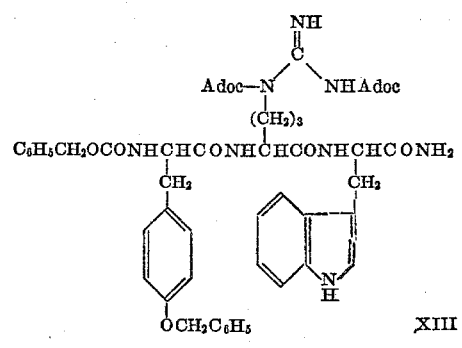
XIII
H₂Pd/C ↓

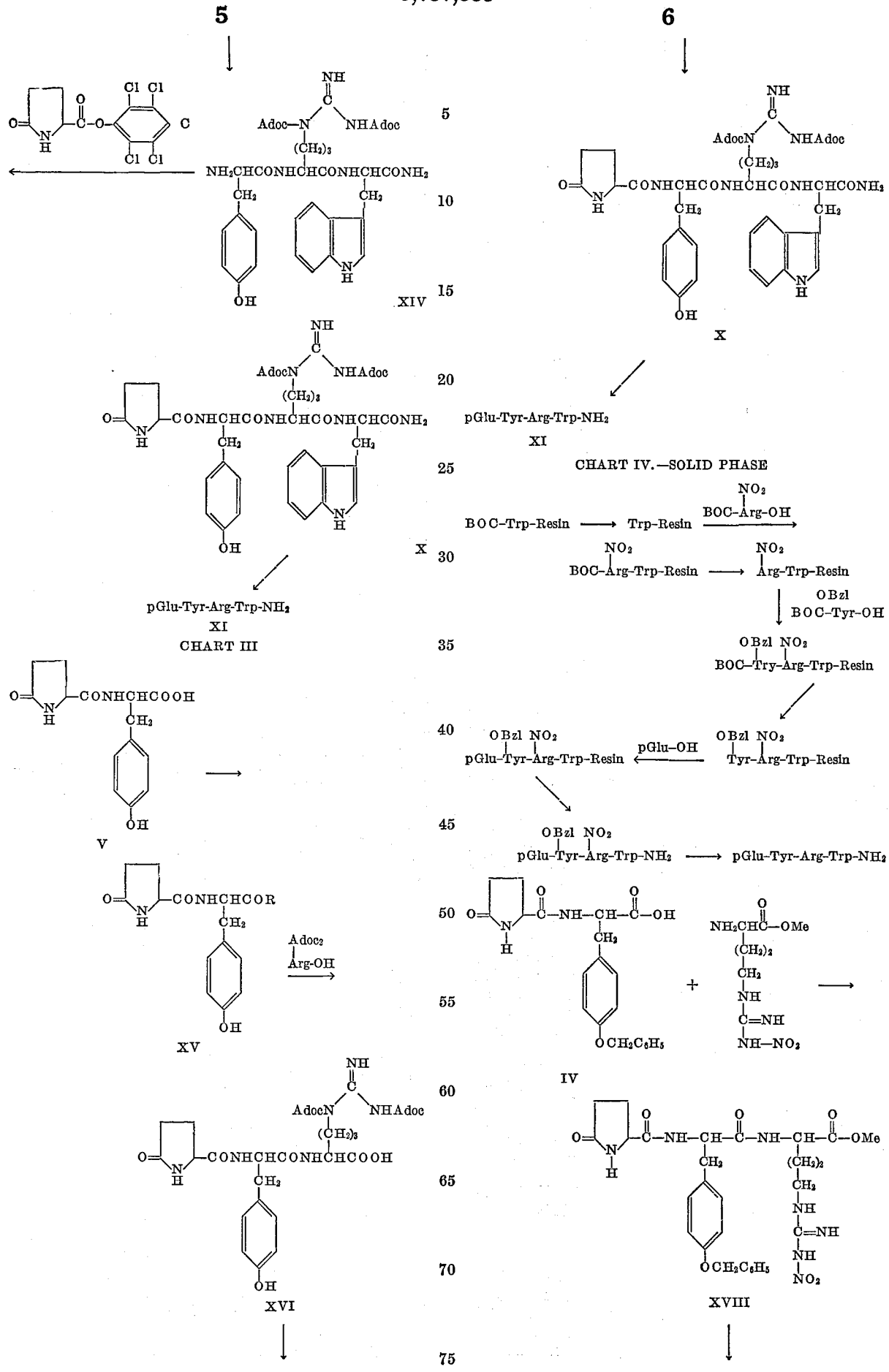

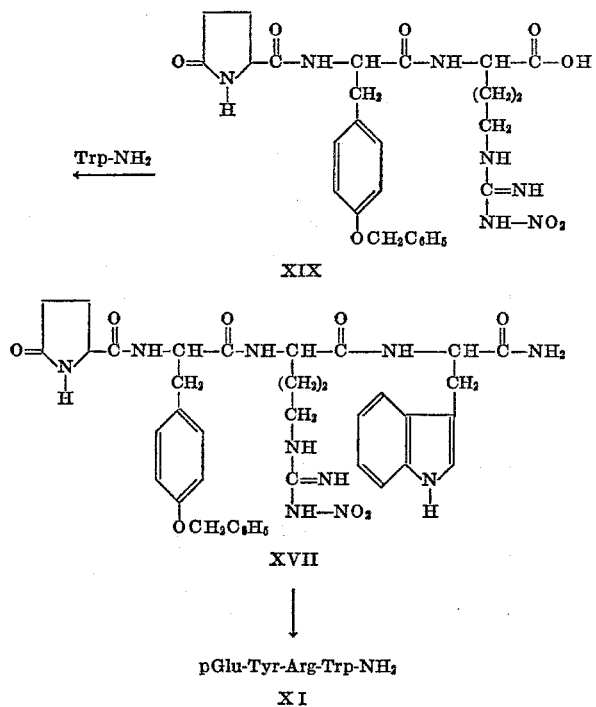

Trp-NH₂ ←

XIX

↓

XVII

↓ pGlu-Tyr-Arg-Trp-NH₂

XI

The following examples are presented to illustrate methods of carrying out the present invention, and it should be understood that the protective groups described in the examples are only illustrative and are not intended to be limitative of the protective groups that can be used to carry out the present invention. Additional applicable protective groups which fall within the scope of this invention include, but are not limited to, such groups as —NH₂ Protecting Groups, carbobenzyloxy-, tosyl-, phthalyl-, benzyl- and parasubstituted benzyl groups ($CH_3O$-, Br-, etc.) trityl-, formyl-, t-Boc-; —COOH Protection Group, salt formation, Me esters and Et ester, benzyl esters, t-Boc ester, hydrazides; Hydroxyl Protection of Tyrosine, O-Acyl- (Aco-, benzoyl-), O-Alkyl- (benzyl-), unprotected tyrosine phenol, Protection of guanidine in Arg, —$NO_2$, CBZ, Adoc, by protonation of the guanidino moiety.

In the examples, melting points were performed on a Thomas Hoover capillary melting point apparatus and are uncorrected. Microanalyses were performed by the Mikroanalytisches Laboratorium, Bonn, West Germany on thin-layer chromatography (Silica gel G). $R_f^1$, $R_f^2$ and $R_f^3$ values refer to the system of n-BuOH:HOAc:EtOAc:$H_2O$ in a ratio of 1:1:1:1; $CHCl_3$:MeOH:$NH_4OH$ solution in a ratio of 60:45:20; and, EtOH:$H_2O$ in a ratio of 7:3 respectively. The nuclear magnetic resonance spectra were measured at 60 mc. on a Varian Associate A-60 spectrometer with $Me_4Si$ as internal reference, and the chemical shift are expressed in τ-values. Parenthetical Roman numeral references in the examples refer to like numerals identifying chemical structure in the preceeding charts.

THE SYNTHESIS OF PYROGLUTAMYLTYROSYLARGINYLTRYPTOPHAN AMIDE

Example I (Chart I)

(A) Pyroglutamyl-O-benzyltyrosine methyl ester (III): L-pyroglutamic acid (I) (2.64 g.) and O-benzyltyrosine methyl ester (II) hydrochloride (6.58 g.) in dry MeCN (100 ml.) and $Et_3N$ (2.8 ml.) were treated with DCI (4.21 g.) at 0° C. After being stirred at room temperature during 16 hours, the reaction mixture was filtered, and the filtrate was evaporated in vacuo to dryness. The residue, which was dissolved in EtOAc (100 ml.) was washed well with 5% citric acid, 5% $NaHCO_3$, and then with brine solution. The organic layer was dried using $Na_2SO_4$, was filtered and then was evaporated. The residue was recrystallized twice from EtOH/n-hexane affording the pure pyroglutamyl-O-benzyltyrosine methyl ester (III) (7 g., yield 86%), M.P. 124° C.-126° C. (dec.), $[α]_D^{22}$+8.1° (1.76, MeOH) $R_f^1$ 0.87 and $R_f^3$ 0.71. Single Cl/tolidine positive spot. τMeOH-$d_4$ 2.69, s., 5H, 3.00, q. 4H aromatic protons. 5.25, s., 2H, O-benzylic methylene protons and 6.36, s. 3H methyl protons.

Analysis.—Calcd. for $C_{22}H_{24}N_2O_5$ was as follows (percent): C, 66.65; H, 6.10; N, 7.07. Found (percent): C, 66.61; H, 5.97, N, 7.18.

(B) Pyroglutamyl - O - benzyltyrosine (IV): Pyroglutamyl-O-benzyltyrosine methyl ester (III) (2.2 g.), in 95% EtOH (50 ml.) was treated with NaOH (1 g.) in $H_2O$ (1 ml.). After being stirred at room temperature during one hour, the reaction mixture was acidified by dilute HCl. The solvent was evaporated in vacuo and the residue was precipitated by addition of $H_2O$ (50 ml.). Pyroglutamyl-O-benzyltyrosine was collected (2 g., yield 94%), and was recrystallized from $CHCl_3$/EtOAc to afford the dipeptide (IV), M.P. 186° C.-187° C. (dec.). $[α]_D^{22}$ +13.1 (c. 153, MeOH); $R_f^1$ 0.82 and $R_f^3$ 0.67; single Cl/tolidine positive spot; τMeOH-$d_4$, 2.66, s., 5H, 2.99, q., 4H, aromatic protons and 4.97, s., and $R_f^3$ 0.67; single Cl/tolidine positive spot; τMeOH-$d_4$, 2H, O-benzylic methylene protons.

Analysis.—Calcd. for $C_{21}H_{22}N_2O_5$ was as follows (percent): C, 65.9°6; H, 5.80; N, 7.33. Found (percent): C, 65.65; H, 5.78; N, 7.50.

(C) Pyroglutamyltyrosine (V): Pyroglutamyl-O-benzyltyrosine (IV) (382 mg.), in absolute EtOH (50 ml.) containing 5% Pd-C as catalyst, was hydrogenated during 2 hours at room temperature and at one atm. pressure. The reaction mixture was filtered and was evaporated in vacuo to the dipeptide (290 mg. yield 99%. This was recrystallized from $Et_2O$ affording the pure pyroglutamyltyrosine. $[α]_D^{22}$ +16.6° (Cl 37, MeOH); $R_f^1$ 0.55, $R_f^2$ 0.58 and $R_f^3$ 0.55; single Pauly and Cl/tolidine positive spot.

(D) $N^α$-benzyloxycarbonyl-$N^g$, $N^ω$-bis-[adamantyl-(1) oxycarbonyl]-arginyl tryptophan amide (VIII): $N^α$-benzyloxycarbonyl-$N^g$, $N^ω$-bis-[adamantyl-(1) - oxycarbonyl] arginine (VI) (665 mg.) and tryptophan amide (VII) hydrochloride (240 mg.), in dry DMF (30 ml.) and $Et_3N$ (0.15 ml., were treated with 1-hydroxybenzotriazole (140 mg.) and DCI (210 mg.) at 0° C. After being stirred at room temperature during 16 hours, the reaction mixture was filtered and the filtrate was evaporated in vacuo to dryness. The residue, which was dissolved in $CHCl_3$ (50 ml.), was washed well with 5% citric acid, 5% $NaHCO_3$ and $H_2O$. The organic layer was dried using $MgSO_4$, was filtered and then evaporated in vacuo. The residue was recrystallized from MeOH-$H_2O$ twice to afford the pure dipeptide (40 mg. yield 51%) M.P. 145°-8° C. (dec.); $[α]_D^{22}$ −15.7° (c. 2.23, $CHCl_3$); $R_f^1$ 0.90, and $R_f^3$ 0.71; single Ehrlich and Cl/tolidine positive spots; τ$CDCl_3$ 2.68, s., 5H, benzyloxy aromatic protons. 492, s., 2H, benzyloxy methylene protons 7.90 and 8.36, s., adamantyl protons.

(E) $N^g$, $N^ω$-bis[adamantyl-(1)-oxycarbonyl] - arginyltryptophan amide (IX): $N^α$-benzyloxycarbonyl-$N^g$, $N^ω$-bis-[adamantyl-(1)-oxycarbonyl] arginyltryptophan amide (VIII) (1 g.) in EtOH (50 ml.) containing 5% Pd-C as catalyst, was hydrogenated during one hour at room temperature and at one atm. pressure. The reaction mixture was filtered and was evaporated in vacuo to the dipeptide (IX) (773 mg., yield 92%). This material was recrystallized from MeOH/$H_2O$ to afford the pure $N^g$, $N^ω$-bis-[adamantyl - (1) - oxycarbonyl]arginyltryptophan amide (IX), M.P. 148° C.–149° C. (dec.). $[\alpha]_D^{22}$ +0.12° (c. 1.62, MeOH); $R_f^1$ 0.83 and $R_f^3$ 0.67; single Ninhydrin, Ehrlich and Cl/tolidine positive spots.

(F) Pyroglutamyltyrosyl-$N^\delta$, $N^\omega$-bis-[adamantyl-(1)-oxoycarbonyl]-arginyltryptophan amide (X): Pyroglutamyltyrosine (V) (140 mg.) in dry DMF (15 ml.), was treated successively with 1-hydroxybenzotriazol (80 mg.) and DCI (110 mg.) and, after and hour, with $N^\delta$, $N^\omega$-bis-[adamantyl-(1)-oxycarbonyl]arginyltryptophan amide (360 mg.). After being stirred at room temperature during 16 hours, the reaction mixture was filtered and the filtrate was evaporated in vacuo to dryness. A portion of this residue was purified by preparative thin-layer chromatography with elution by $CHCl_3$:MeOH (v./v. 8:2) to afford the pure (X); single Ehrlich, Pauly and Cl/tolidine positive spots. $R_f^1$ 0.81 and $R_f^3$ 0.62.

(G) Pyroglutamyltyrosylarginyltryptophan amide (XI): Pyroglutamyltyrosyl-$N^\delta$,$N^\omega$-bis-[adamantyl-(1)-oxycarbonyl]-arginyl tryptophan amide (X) was dissolved in 2 ml. of glacial HOAc which was saturated with HBr. After 30 minutes, the reaction mixture was treated with anhydrous ether. The solvent was decanted and the precipitate of (XI) was collected. Single Pauly, Ehrlich, Sakaguchi, Cl/tolidine positive spot. $R_f^1$ 0.58, $R_f^2$ 0.20 and $R_f^3$ 0.47.

Example II (Chart II)

N-carbobenzoxy-O-benzyltyrosine (XII), in the form of a mixed anhydride from reaction with $ClCO_2Et$, was allowed to react with $N^\delta,N^\omega$-bis-[adamantyl-(1)-oxycarbonyl]-arginyltryptophan amide (IX) to give N-carbobenzoxy - O - benzyl-$N^\delta,N^\omega$-bis-[adamantyl-(1)-oxycarbonyl]-arginyltryptophan amide (XIII) which was then subjected to hydrogenolysis with 5% Pd-C for removal of the carbobenzoxy and O-benzyl group. The resulting tripeptide, tyrosyl-$N^\delta,N^\omega$-[adamantyl-(1)-oxycarbonyl]-arginyltryptophan amide (XIV), was coupled with an activated ester of pyroglutamic acid from pentachlorophenol, to afford pyroglutamyltyrosyl-$N^\delta,N^\omega$-bis-[adamantyl-(1)-oxycarbonyl]-arginyl-tryptophan amide (X). This protected tetrapeptide (X) was converted successively into pyroglutamyltyrosylarginyltryptophan amide (XI) as shown in Chart I above.

Example III (Chart III)

Pyroglutamyltyrosine (V) as its activated ester, was reacted with $N^\delta,N^\omega$-bis - [adamantyl-(1)-oxycarbonyl]-arginine to afford pyroglutamyl-tyrosyl-$N^\delta,N^\omega$-bis-[adamantyl-(1)-oxycarbonyl-arginine] (XVI), which was then coupled with tryptophan amide via the DCI method to give the protected tetrapeptide (X). Pyroglutamyltyrosyl-$N^\delta,N^\omega$ - bis - [adamantyl-(1)-oxycarbonyl]-arginyltryptophan amide (X) was converted successively into pyroglutamyltyrosylarginyltryptophan amide (XI) as shown in Chart I above.

Example IV (Chart IV)

In this example, commercially available chloromethylated resin, nitrated chloromethylated resin, or any similar resin suitable for attachment of amino acids was used and tert-butyloxycarbonyl (t-Boc) derivatives of the amino acids were also used. Alternatively and to improve the solubility of nitroarginine in methylene chloride, its tert-amyloxycarbonyl (Aoc) derivative was used.

The coupling reactions were carried out in methylene chloride or dimethylformamide mediated by dicyclohexylcarbodiimide. In the deprotection steps, 25% trifluoroacetic acid in methylene chloride with mercaptoethanol was used. The deprotection of the blocked tetrapeptide from the resin was accomplished by stirring the resin in methanol saturated with ammonia. The final product, pGlu-Tyr-Arg-Trp-$NH_2$, was obtained by catalytic hydrogenation to remove the protective groups.

Example V (Chart V)

Pyroglutamyl-O-benzyltyrosine (IV) was coupled with $N^G$-nitroarginine methyl ester via the DCI method using DMF as solvent to afford pyroglutamyl-O-benzyltyrosyl-$N^G$-nitroarginine methyl ester (XVIII) in 55% yield, M.P. 173° C.–175° C. (dec.). $[\alpha]_D^{22}$ –3.2° (c. 1.00, DMF). Single Cl/tolidine positive spot. $\tau$MeOH-$d_4$ 2.65, s., 5H, 2.95, q. 4H, aromatic protons. 4.95, s., 2H, O-benzylic methylene protons and 6.30, s., 3H, methyl protons.

Analysis.—Calcd. for $C_{28}H_{35}N_7O_8$ was as follows (percent): C, 56.27; H, 5.90; N, 16.41. Found (percent): C, 56.21; H, 5.87; N, 16.46.

This tripeptide (XVIII) was subjected to alkaline hydrolysis in quantitative yield and the resulting pyroglutamyl-O-benzyltyrosyl-$N^G$-nitroarginine (XIX) was coupled with tryptophan amide via the DCI method giving the protected tetrapeptide (XVII). Pyroglutamyltyrosylarginyltryptophan (XI) was obtained from the hydrogenolysis of pyroglutamyl-O-benzyltyrosyl-$N^G$-nitroarginyltryptophan amide (XVII) using Pd-C as catalyst.

The hormonal activity, in principle, of pGlu-Tyr-Arg-Trp-$NH_2$ is revealed and demonstrated by the data shown in Table I below. These data show that pGlu-Tyr-Arg-Trp-$NH_2$ releases the luteinizing hormone from the anterior lobe of the pituitary in the rat. In this assay, it can be seen that dosage at 50 micrograms is minimal, but dosages of 200 and 600 micrograms caused optimal release of the luteinizing hormone. These data are important since they establish the hormonal activity in vivo of the new tetrapeptide rather than an exact dose-response relationship.

The bioassays for the activity of the luteinizing hormone releasing hormone which were performed upon samples of the new tetrapeptide of this invention were carried out by the method of Ramirez and McCann (Endocrinology, vol. 73, p. 193 (1963). Adult Sprague-Dawley female rats were used six weeks to three months after ovariectomy. The rats were subcutaneously injected with 50 micrograms of estradiol benzoate and 25 micrograms of progesterone dissolved in sesame oil 72 hours before the assay. Under ether anesthesia, blood was collected from the jugular vein, and the test solution of the tetrapeptide was injected into this vein; in 15 minutes, blood was again collected. Each test solution was assayed in two rats. Serum assays for the luteinizing hormone were performed in duplicate by the double antibody radioimmuno assay of Niswender et al. (Proc. Soc. Exp. Biol. Med., vol. 128, p. 807 (1968)) using antiovine leuteinizing hormone serum and ovine luteinizing hormone—[131]I. The results are expressed in terms of millimicrograms per ml. of the LER–1240–2–0.60 LH-Si units milligram of the National Institutes of Health.

TABLE I

[Data on the hormonal activity of pGLU-TYR-ARG-TRP-$NH_2$]

| Dose of peptide in μg. | mμg LH/ml. serum [1] | |
|---|---|---|
| | Before | After |
| 50 | 2.5 | 12.5 |
| | 5.74 | 8.5 |
| 200 | 3.25 | 120 |
| | 4.24 | >142 |
| 600 | 4.24 | >142 |
| | 6.5 | >142 |

[1] Serum assay for LH was made in duplicate by a double antibody radioimmunoassay, and the activity was determined by comparison of LH levels before and after injection of the peptide.

What is claimed:
1. A synthetic tetrapeptide, L-p-glutamyl-L-tyrosyl-L-arginyl-L-tryptophan amide, having the structure:
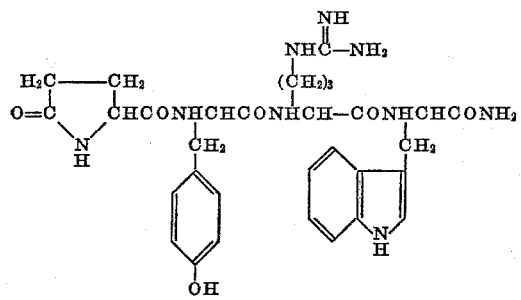
said tetrapeptide being characterized in that it exhibits the same activity as the luteinizing hormone of the hypothalamus gland of mammals.
References Cited
Merrifield, "JACS" (1963), vol. 85, pp. 2149–2154 relied on.
ELBERT L. ROBERTS, Primary Examiner
U.S. Cl. X.R.
424—177